United States Patent [19]

Yoshida et al.

[11] Patent Number: 5,614,934
[45] Date of Patent: Mar. 25, 1997

[54] PRINTER

[75] Inventors: Yasuhiro Yoshida, Nara; Gen Itoh, Amagasaki; Hiroyuki Furukawa, Ueno; Masaki Takakura, Higashiosaka, all of Japan

[73] Assignee: Sharp Kabushiki Kaisha, Osaka, Japan

[21] Appl. No.: 101,032

[22] Filed: Aug. 3, 1993

[30] Foreign Application Priority Data

Aug. 10, 1992 [JP] Japan ................................. 4-234328

[51] Int. Cl.$^6$ .................................. B41J 2/36; B41J 2/365
[52] U.S. Cl. ............................................ 347/189; 358/461
[58] Field of Search .................................. 347/171, 172, 347/173, 174, 175, 176, 189; 358/455, 456, 461

[56] References Cited

U.S. PATENT DOCUMENTS

| 4,786,917 | 11/1988 | Hauschild | 347/195 |
| 4,839,722 | 6/1989 | Barry et al. | 358/80 |
| 5,291,220 | 3/1994 | Klees | 347/172 |

FOREIGN PATENT DOCUMENTS

| 0144188 | 6/1985 | European Pat. Off. |
| 2-090142 | 3/1990 | Japan |

OTHER PUBLICATIONS

Tajima Johji, "Color Reproduction Processing for Digital Pagination System", (Journal of Japan Electro-communication Society, 85/4 vol. J68–D No. 4, pp. 710–717).

"Image processing devices for use in the field of printing and printing-plate making", pp. 124–127, May 19, 1991.

Primary Examiner—Huan H. Tran

[57] ABSTRACT

A color correction circuit is best adjusted to consistently obtain a stable, color printing by compensating for a change in the characteristic of a printer under the influence of ambient temperature and humidity.

Before the printing of pictorial data, e.g., an image, (reference data produced by a reference data generator), is entered into a printer engine by which it is printed out on a sheet of a paper. This printed data is read in by a color sensor, which in turn produces an output detection signal. A feedback control circuit produces a control signal necessary for a color correction according to the output signal of the color sensor and then sends it to the color correction circuit. The color correction circuit is adjusted and corrects the colors of the pictorial data to be printed. The corrected data is printed out. Repeating this process for each color printing can prevent a variation in the printed colors due to the effect of ambient temperature.

5 Claims, 6 Drawing Sheets

PRINTER

BACKGROUND OF THE INVENTION

The present invention relates to a printer and more particularly to a construction of a full-color printer which is reliable without being affected by ambient conditions such as ambient temperature and humidity.

Recently, color reproduction of documents by office automation facilities such as color printers, color scanners, color copiers and so on is being advanced. However, color printers cannot always reproduce an expected color according to the reference data when printing the latter on a sheet of paper. This may be due to two possible reasons. One of the reasons is concerned with the coloring method for color printing. Color printing utilizes the principle of subtractive color mixture, i.e., color is reproduced by superimposing three or four coloring materials (light absorbing pigments or dyes) on an image carrier starting from white (a colorless reflected image carrier), but in many practical cases, the fundamental principle for the above-mentioned subtractive color mixture, i.e., the addition and multiplication effects cannot be realized. To solve this problem, a variety of color correction circuits have been proposed.

The most simple method is to carry out the following 3×3 matrix operation according to the input signals "r", "g" and "b" representing red, green and blue respectively.

$$\begin{vmatrix} R \\ G \\ B \end{vmatrix} = \begin{vmatrix} a_{11} & a_{12} & a_{13} \\ a_{21} & a_{22} & a_{23} \\ a_{31} & a_{32} & a_{33} \end{vmatrix} \begin{vmatrix} r \\ g \\ b \end{vmatrix} \quad (1)$$

In the equation (1), R (red), G (green) and B (blue) are corrected signals and $a_{11}$–$a_{33}$ are correction factors. These outputs may be subjected to further gamma correction through a gamma table.

The second possible reason for which the expected color is not always obtained is that the characteristic of the printer changes with elapsed time under the influence of ambient temperature and humidity. For instance, in a sublimation type printer, the printing density is determined according to the temperature of the printing head (i.e., heat energy applied to the printing head). But, since the temperature of the printing head may be affected by the ambient temperature, it is clearly understood that the printing density may vary under the influence of the ambient temperature.

Consequently, a problem has been created where the conventional printer cannot always print out the same data in the same color. Therefore, much time is required for the initial adjustment and maintenance of the printer. This increases the total cost of manufacturing and maintaining the product.

To solve the above-mentioned problem, a printer capable of printing the correct color has been proposed, which has a temperature sensor and controls the amount of energy applied to a printing head by adjusting a constant of a color correction circuit, according to ambient conditions.

The Japanese publication of unexamined patent application JP, A, 2-90142 also discloses a picture image recording device which includes a color printer capable of changing a color correction factor by sensing a variation in the of light's luminosity of the original picture.

Furthermore, TAJIMA Johji, "Color Reproduction Processing for Digital Pagination System," (Journal of Japan Electro-communication Society, 85/4 vol. J68-D No. 4, p.710–717) introduced a color reproduction processing method which is practically applicable in a computer system for making color printing plates. Since in the computer system color images to be printed with cyan (C), magenta (M), yellow (Y) and black (B) inks shall be finally processed on a RGB(Red-Green-Blue) type CRT monitor, the following three kinds of color reproduction problems, i.e., (1) true display of a RGB image, (2) conversion of the RGB color system to the CMYK color system and (3) simulation display of a CMYK image are of great importance. The paper reported that the method could conduct the above-mentioned three kinds of color reproduction processing with a maximal chromatical correctness, obtaining practically satisfactory results.

The above-mentioned method for obtaining the expected colors is such that, the optical density of the print is controlled according to the detected heating temperature of the ink and the illumination of the original picture, which are subsidiary factors not being directly concerned with the printing color's density. The fact that the detected elements are different from the controlled object makes it difficult to design a practical device with an effective controlling system in its operations. Consequently, the prior attempts have not obtained satisfactory results.

SUMMARY OF THE INVENTION

It is an object of the present invention to provide a printer which is best adjusted to consistently obtain a stable, color printing by compensating for a change in the characteristic of a printer under the influence of ambient temperature and humidity.

It is another object of the present invention to provide a printer which is provided with a reference data generator, a color sensor, a feedback control circuit and a color correction circuit, by which the reference data having certain colors is initially printed out and checked for the mismatching of the printed colors with the reference data, which may be caused by a variation of in the characteristic of the printer under the influence of the ambient conditions, and the constant of the color correction circuit is so adjusted that the data may be printed in the correct colors. The use of the above-mentioned system, whereby the practically printed colors are sensed and checked for mismatching with their known properties and then the necessary color correction is made for realizing the correct color printing without being affected by the ambient conditions, makes it possible to easily design and manufacture a printer that may operate stably without being affected by the ambient conditions.

Consequently, the reliability of the product in the stages of the initial design and the final adjustment before shipping from the shop is so increased as to improve the quality and performance of the product. The time required for the adjustment of the product can also be shortened, which may contribute to a savings in the cost of the product. Furthermore, the maintenance for correcting a change in the characteristic of the printer can be completed in a short time which may save considerably in the maintenance costs. In other words, the product can be maintained in the best condition at a minimum cost. The product may therefore be manufactured at reduced cost and with improved performance.

It is another object of the present invention to provide a printer which is provided with a cutter for cutting off the portion of a printed sheet whereon the reference data was initially. This eliminates the possibility of giving viewers a negative by impression showing the unnecessarily printed patterns.

The reference data generator produces data serving as a reference in determining any variation in printing color under the influence of the ambient conditions. This data is initially printed out on printing paper by the printer's engine but is not always printed in the expected colors due to the influence of a variation in the ambient conditions.

Next, the printed reference data is read in by the color sensor. The feedback control circuit produces a control signal necessary to adjust the constant color correction circuit on the basis of the read in data. The color correction circuit makes a color correction according to the control signal in order to reproduce the correct colors without being affected by the ambient conditions.

The printer, according to the present invention, may operate stably without being affected by the ambient conditions because it prints out the reference data, detects the printed colors, determines a variation in the printed colors from the references and finally corrects the colors to be printed.

In view of the foregoing, the present invention was made to provide a printer comprising a data generator for producing reference data to determine a variation in printing colors, a printer engine, a color sensor for measuring the reference data printed by the printer engine according to the produced data, a feedback control circuit for producing a control signal according to an output signal of the color sensor and a color correcting circuit which is constant by adjusted by the control signal to eliminate a variation in color caused by a variation in ambient conditions, characterized in that the printing is carried out through the color correcting circuit, and is also characterized by being provided with a cutter for cutting-off a marginal portion of the printed paper, whereon the reference data is printed by the printer engine,according to the data output from the reference data generator.

PREFERRED EMBODIMENT OF THE INVENTION

Figure 1:
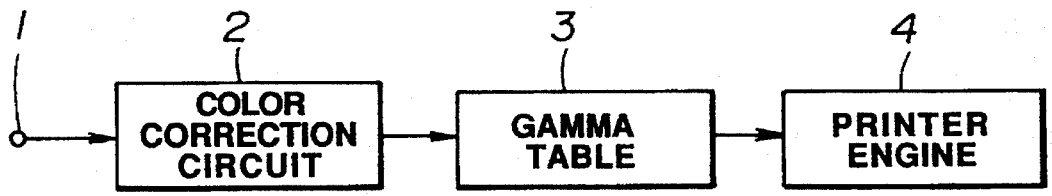
FIG. 1 is a view showing the basic construction of the prior art printer including a conventional color correction circuit.

FIG. 1 shows the basic construction of the prior art printer having a conventional color correction circuit. This printer is basically composed of a color correction circuit 2, a gamma table 3 and a printer engine (printer) 4.

A signal applied to an input terminal 1 is subjected to color correction in a color correction circuit 2 according to the matrix operation expression (1). The color-corrected signal through the gamma table 3 is fed to the printer engine 4. If the printer engine 4 is supposed to be a sublimation type printer, its head is heated according to the applied signal and makes the ink sublimely diffuse and be transferred to a sheet of printing paper. Ink to be sublimated by the heated head of the sublimation type printer is characterized by a certain relationship between the energy applied to the printing head and the optical density of the print by sublimated ink.

Figure 2:
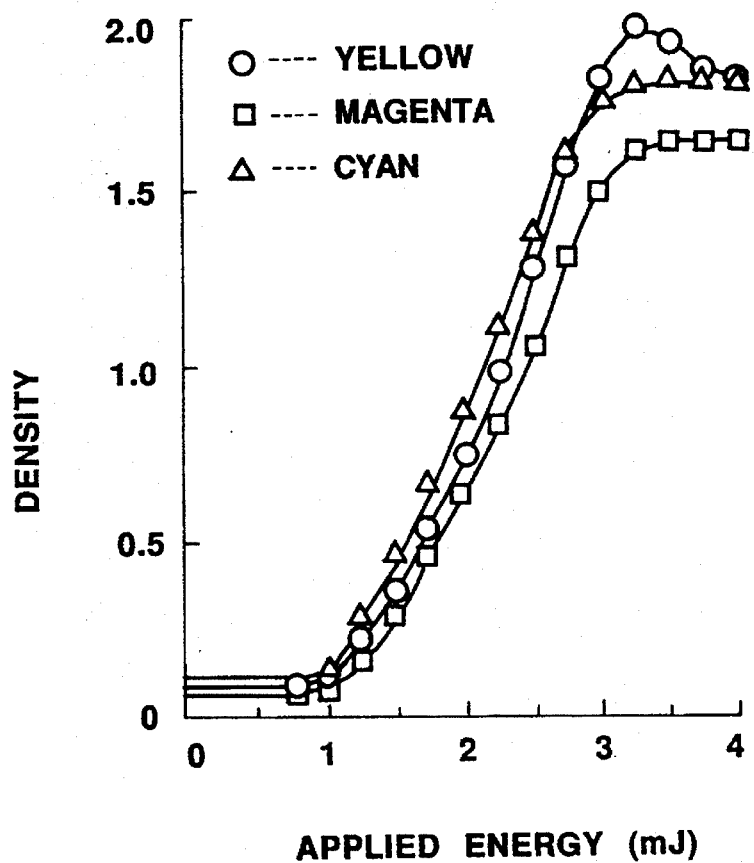
FIG. 2 is a graph showing the correlation between the printing color density D and the energy (in milli-Joule) as applied to the printing head of a sublimation type printer.

FIG. 2 is a graph showing the correlation between the print's color density (D) and energy (in milli-joule) applied to the printing head of a sublimation type printer. The symbols o□Δ in FIG. 2 show yellow, magenta and cyan respectively. Various kinds of inks may have different values of print density with the same energy applied to the printing head. For this reason, data printing is carried out by adjusting the heat energy applicable to the printing head for each color according to the color image.

Figure 3:
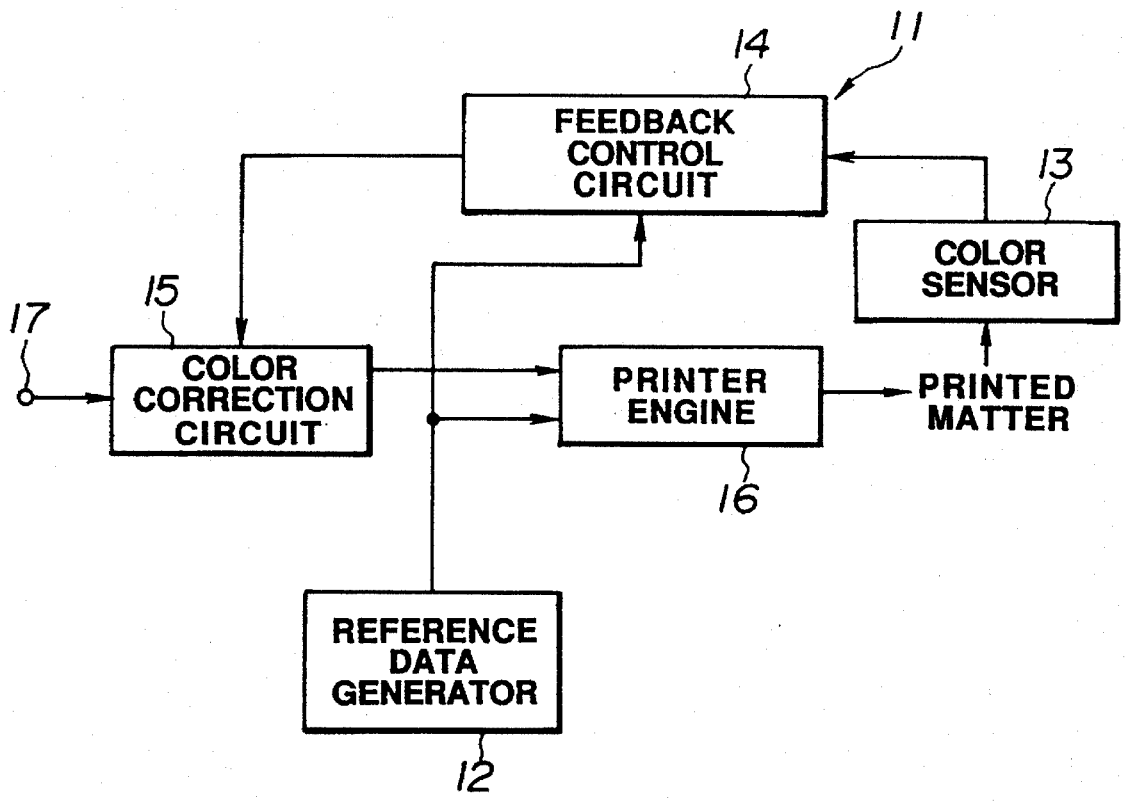
FIG. 3 is a view for explaining the basic construction of a printer embodied in the present invention.

FIG. 3 is a view for explaining a basic construction of a printer embodied in the present invention, which includes, a reference data generator 12, a color sensor 13, a feedback control circuit 14, a color correction circuit 15, a printer engine 16 and a color data input terminal 17. The shown printer 11 is controlled from a host computer.

Figure 4:
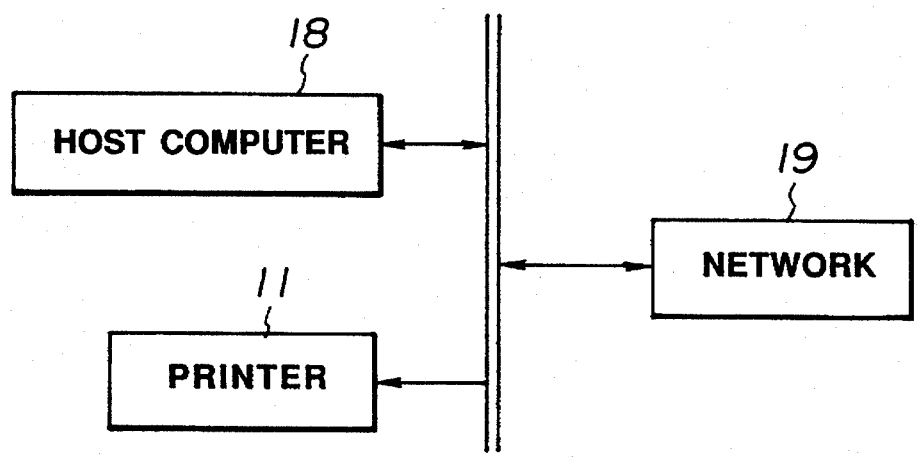
FIG. 4 is a block diagram showing a control system of a host computer for a printer according to the present invention.

FIG. 4 is a block diagram showing a control system comprising a host computer for a printer according to the present invention. The printer 11 is controlled by the host computer 18 and operates through a network 19 in the controllable ambient conditions.

When the host computer 18 sends a command to start printing, the printer starts to carry out sequential operations under the control of the host computer as follows:

The reference data generator 12 produces reference data for determining a variation in the printed color under the influence of ambient conditions. This data is input to the printer engine 16 which in turn initially prints out the data on an inconspicuous marginal portion, e.g., a corner of a sheet of printing paper. The color sensor 13 detects the printed reference data and inputs them into the feedback control circuit 14 which in turn generates a control signal necessary for controlling the color correction circuit 15 according to the sensed data. The color correction circuit 15 receives the control signal and determines the color correction factor to eliminate a variation in the colors being printed under the influence of the ambient conditions. The color correction circuit 15 receives data to be printed out from the host computer 18 through the input terminal and performs the color correction for said data. The data to be printed out may be transferred from the host computer 18 to the color correction circuit 15 either for the period from the time of the initial printing of the reference data to the determining of the constant of the color correction circuit 15 or after determining the circuit's constant. The corrected data is now printed out by the printer engine 16.

The construction and operation of each component is described in detail as follows:

The reference data generator 12 is intended to store a set of reference data to be printed out in a ROM and hard disk memory. The data from the reference data generator 12 is digital data and corresponds to the printing colors, e.g., red, blue, green, yellow, purple, light blue and black. Each of digital color data may have a given gradation. This data is initially printed out on a sheet of printing paper according to a starting command given by the host computer 18.

Figure 5:
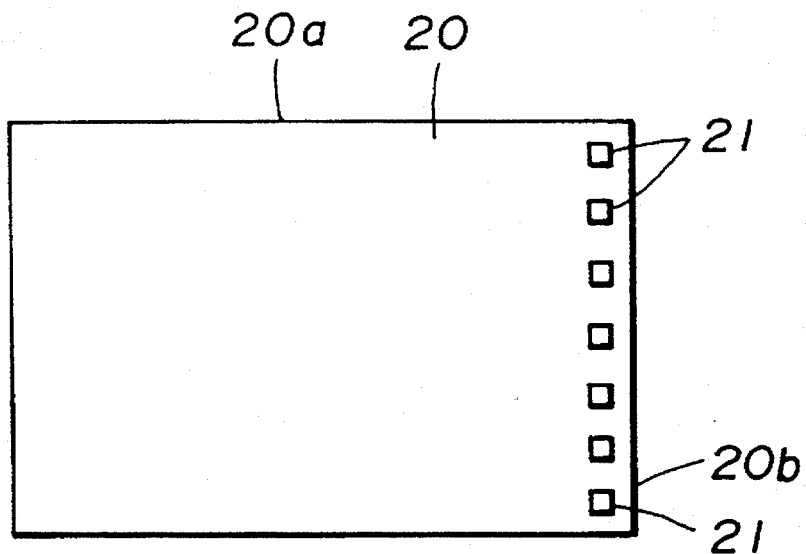
FIGS. 5A and 5B are views showing examples of arrangements of reference colors to be initially printed on a sheet of printing paper by a printer according to the present invention.
Figure 5:
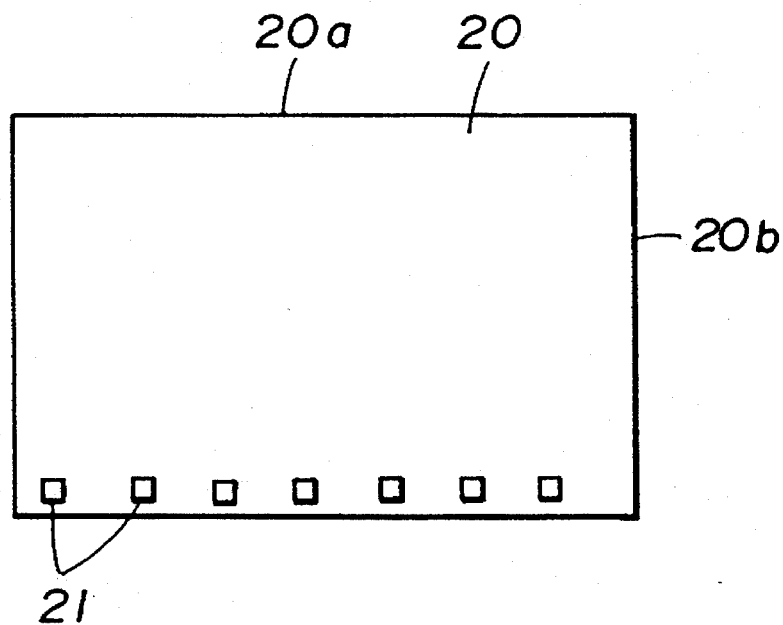

FIGS. 5A and 5B are views showing examples of arrangements of reference colors to be printed on a sheet of printing paper by a printer, according to the present invention. The printed reference data 21 can be arranged along a short side margin 20b of a printing sheet of paper 20 as shown in FIG. 5A or along a long side margin as shown in FIG. 5B. In both cases they are printed in a marginal corner of the paper. Any arrangement can be applied but it may be concerned with the construction of the color sensor and a printing paper cutter to be described later. It is also unnecessary to limit the printing order of the colors. The number of reference colors may not be limited to 7 colors as defined by way of example in the shown case. As described above, it is possible to indicate a gradation in each color.

Figure 6A:
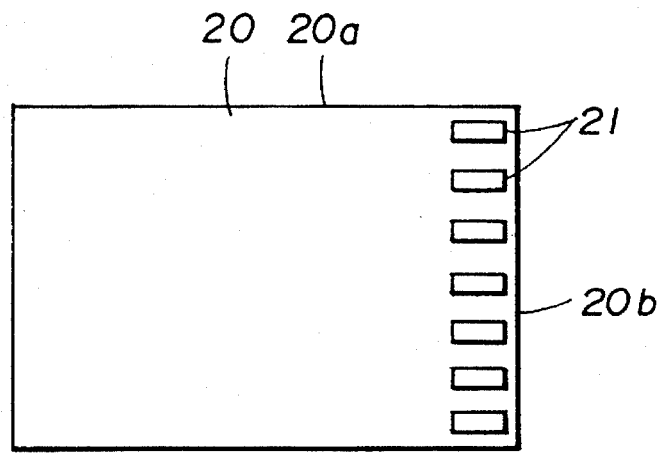
FIGS. 6A, 6B and 6C are views showing examples of giving gradation to reference colors to be initially printed on a sheet of printing paper by the printer, according to the present invention.
Figure 6B:
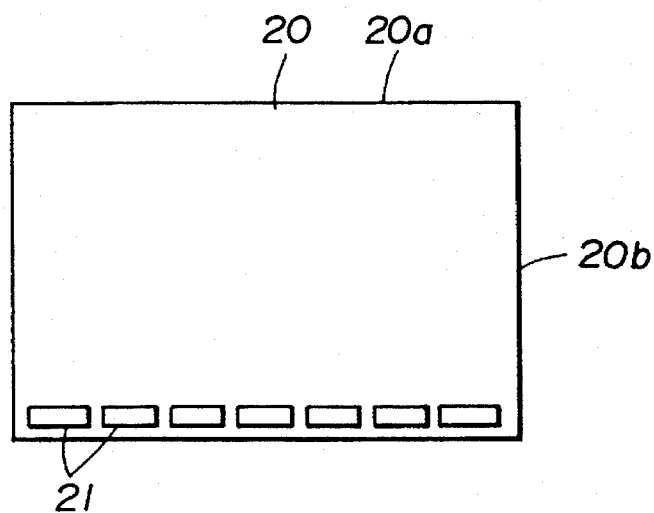
Figure 6C:
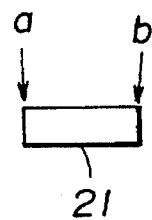

FIGS. 6A, 6B and 6C are views showing examples of the gradation of each reference color to be printed on a sheet of printing paper by the printer, according to the present invention. FIG. 6A shows that the printed reference data 21 is arranged along a short side margin 20b of the printing paper 20, with gradations of each color from deep (portion a) to light (portion b) in a rectangle as shown in FIG. 6C. FIG. 6B shows that the printed reference data 21 is arranged along the long side margin 20a of printing paper 20, with gradations in each color from deep (portion a) to light (portion b) in a rectangle as shown in FIG. 6C.

Thus initially printed out reference data is read in by the color sensor 13. Accordingly, the value of the optical density of the printed data is determined, that refers to how the printer is influenced by the ambient conditions at the time of starting the printing operation.

Figure 7:
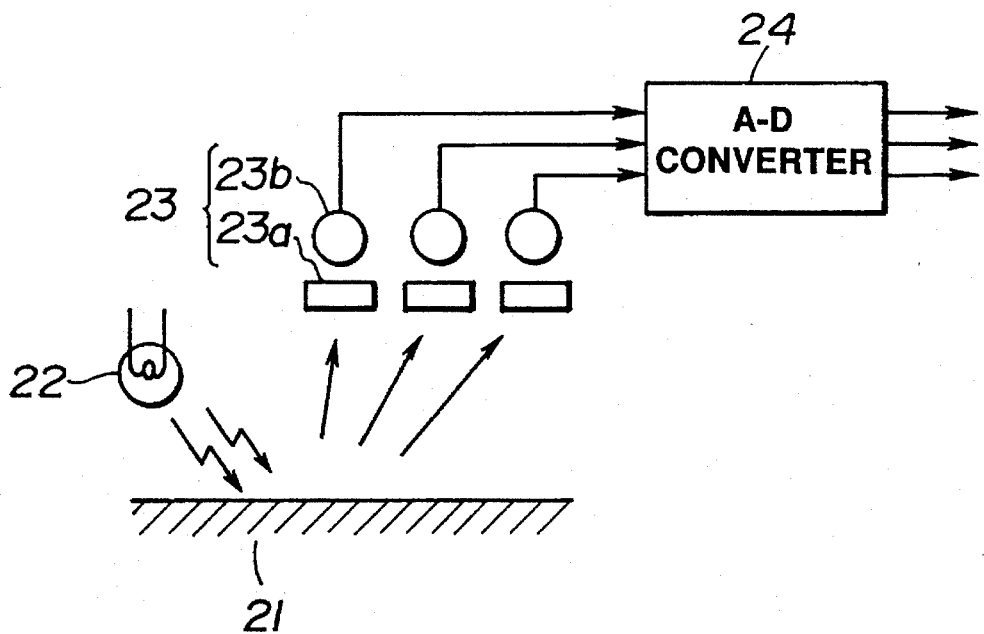
FIG. 7 is a view for explaining how to read reference data by a color sensor of a printer according to the present invention.

FIG. 7 is a view for explaining how to read reference data by the color sensor of a printer, according to the present invention. A printed reference data 21, a light source 22, a sensing portion 23 and an A-D converter 24 are shown.

The color sensor system 13 comprises a light source 22, a color sensing portion 2S, including three optical filters R (red), G (green) and B (blue) 23a and three corresponding sensing elements 23b and an A-D converting portion 24 and is secured near an outlet portion of the printer engine 16, wherefrom printed paper is taken out. This system is available as a color measuring unit or may be constructed of discrete parts such as CCD (charge-coupled device used as a sensor), lamp, filters and electronic circuits.

In FIG. 7, light from the light source 22 reflects at a surface of the printed reference date 21, whereon reference data are preliminarily printed out and passes through the filters 23a and reaches the sensing elements 23b. If the spectral sensitivity that is determined by the filters 23a and the sensing elements 23b is initially defined as those corresponding to adequate input signals "r", "g" and "b" (vectors) and to isochromatic functions "x", "y" and "z" (vectors), the sensing elements 23b may produce an output proportional to the colors according to the RGB-colorimetric metric system and the XYZ-colorimetric system of the CIE (International Commission on Illumination).

The A-D converter 24 converts an output signal of the sensing portion 23 into a digital signal.

A plurality of the color sensors 13, each comprising the components shown in FIG. 7, may be used to realize the simultaneous measurement of a plurality of reference data sets to assure the saving of time. It is also possible to use linearly arranged filters 23a and sensing elements 23b instead of using a plurality of color sensors 13. In any case, a three color separating system must be used to produce an output corresponding to an XYZ-value of the CIE standard colorimetric system and an RGB-value according to characteristic of a three color separating filter.

An arrangement of colors when printing reference data is as follows:

In the case of using the sensor shown in FIG. 7, colors are printed on the long side margin 20a of a printing paper 20 while in the case of using a line sensor they are printed on the short side margin 20b of the printing paper 20. Accordingly, the printed reference data can be read in through the color sensor 13 when the printed paper 20, being moved in a longitudinal direction near the color sensor 13, by means of a paper driving device (usually included in the printer engine 16).

The feedback control circuit 14 produces a signal necessary for controlling the color correction circuit, 15 in order to the correct colors to be printed by eliminating the influence of the ambient conditions according to the read in data. The feedback control circuit 14 is constructed by using a standard type central processing unit (CPU) to produce a feedback control signal.

Figure 8:
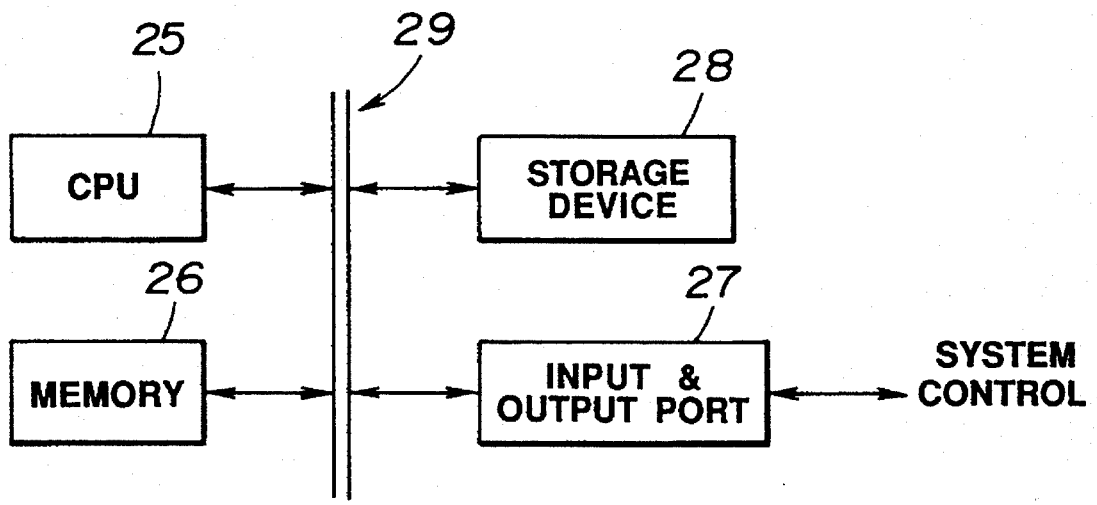
FIG. 8 is a view showing an example of the construction of a feed back control circuit of a printer according to the present invention.

FIG. 8 is a view showing an example of a construction of a feedback control circuit of a printer according to the present invention. The feedback control circuit 14 can use the usual computer that is comprises a CPU unit 25, a memory 26, an input-output port 27, a storage device 28 and a bus 29. The controller used for system control in a conventional printer can also be applied as the feedback control unit. A thus constructed feedback control unit can be used in combination with the reference data generator 12 shown in FIG. 3.

An operating program (software) for the feedback control circuit 14 is as follows:

The program for the feedback control circuit 14 is basically constructed as a data conversion program that treats data from the sensor unit as input data and data from the feedback control circuit 14 as output data.

For example, if the input data is expressed as xyY and the output data is expressed as $a_{11}$–$a_{33}$ in the equation (1), the conversion program ff is expressed as follows:

$$a_{11}\text{–}a_{33} = \mathrm{ff}(xyY) \tag{2}$$

The program ff may be prepared in the form of a table or set of functions.

The content of the program is prepared in the process of product development and is preset in a ROM or a hard disk memory. The procedure for presetting the program content is described as follows:

First, the reference data is printed out under various ambient conditions with the measurements of the printed colors to receive measured values x' y' Y'. The thus obtained values may be expected to be varied and to differ from each other. Next, factors $a_{11}$–$a_{33}$ in the equation (1) are so adjusted that the measured values of the printed results obtained at different ambient conditions may be equal to the standard value obtained at standard ambient conditions.

For instance, if the program ff is edited in the form of a table, it is composed as follows:

Measured values x' y' Y' of the printed colors at different ambient conditions are taken as addresses of memory and factors $a_{11}$–$a_{33}$ obtained at corresponding conditions are memorized with the respective addresses in the memory.

By doing so, it is possible to create a printer that is capable of carrying out correct color printing even at different ambient conditions.

The printer, according to the present invention, can be used in the same way as a usual printing apparatus if the feedback control circuit is set at OFF position. It is recommended to provide a switch to switch off the feedback control circuit if necessary.

Figure 9:
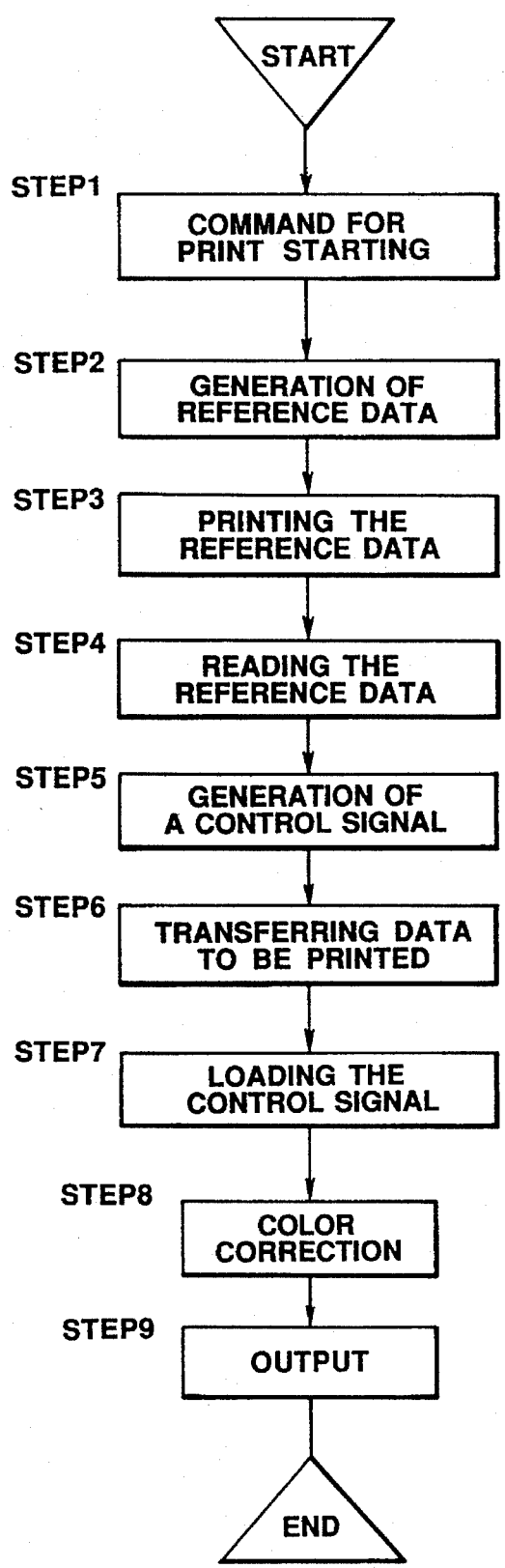
FIG. 9 is a flow chart showing the operations of a printer according to the present invention.

Referring now to FIG. 9, we will explain the sequential operations of the printer embodied in the present invention according to the flow chart shown as follows:

Step 1: When a start signal is switched to ON, the host computer 18 sends a command to start the printing operation.

Step 2: The reference data generator 12 produces data to be used as the criterion for determining a variation in the printed colors due to a variation in the ambient conditions.

Step 3: The printer engine 16 receives the reference data from the generator 12 and prints out said reference data on a printing paper sheet.

Step 4: The color sensor 13 reads the printed reference data.

Step 5: The feedback control circuit 14 prepares a control signal for the color correction circuit 15 according to the data read by the color sensor 13.

Step 6: The host computer 18 sends out the data to be printed.

Step 7: The control signal prepared in step 5 is loaded to the color correction circuit 15.

Step 8: The data transferred from the host computer, through the input terminal 17, which shall be printed out, is corrected for color according to the reference data by the color correction circuit 15, having a constant of adjustment in advance.

Step 9: The data are printed out in the colors corrected according to the reference data. A series of operations is completed.

In the printer, according to the present invention, the printed reference data 21 initially printed on a marginal corner of the printing paper represents unnecessary patterns that may give an unfavorable impression to viewers. This may be avoided by providing the printer engine 16 with a cutter for cutting off the unnecessary portion of the printed reference data of 21 of the printed paper 20.

We claim:

1. A printer comprising:
   a reference data generator for producing reference data to determine a variation in printing colors;
   a printer engine for printing the reference data;
   a color sensor for measuring the reference data printed by the printer engine;
   a feedback control circuit for producing a control signal according to an output signal of the color sensor;
   a color correction circuit which is constantly adjusted by the control signal to eliminate a variation in color caused by a variation in ambient conditions; and
   further including a cutter for cutting off a portion of printed paper, on which said reference data is printed.

2. A printer comprising:
   a reference data generator for producing reference data to determine a variation in printing colors under the influence of ambient conditions;
   a printer engine for printing on a substrate said reference data;
   a color sensor for measuring the reference data printed by the printer engine;
   a feedback control circuit for producing a control signal according to an output signal of the color sensor;
   a color correction circuit which is constantly adjusted by the control signal to eliminate a variation in color caused by a variation in the ambient conditions, so that as the printer engine performs printing, the printing is in response to the color correction circuit to eliminate variations in color caused by variations in the ambient conditions; and
   a cutter for cutting off a portion of the substrate on which said reference data is printed.

3. A printer comprising:
   a reference data generator for producing reference data to determine a variation in printing colors under the influence of ambient conditions;
   a printer engine for printing on a substrate said reference data;
   a color sensor for measuring the reference data printed by the printer engine;
   a feedback control circuit for producing a control signal according to an output signal of the color sensor; and
   a color correction circuit which is constantly adjusted by the control signal to eliminate a variation in color caused by a variation in the ambient conditions, so that as the printer engine performs printing, the printing is in response to the color correction circuit to eliminate variations in color caused by variations in the ambient conditions,
   wherein the reference data is printed along an edge margin of said substrate and is formed of a plurality of distinct portions spaced from each other in which each portion has a color which varies in color along its edge margin from deep to light.

4. A method of printing data including compensating for variations in color caused by temperature or humidity of the ambient comprising the steps of:
   (a) producing reference data to be used for determining variations in color due to variations in ambient conditions;
   (b) printing said reference data along a margin of a substrate;
   (c) reading said reference data with a color sensor;
   (d) producing a signal in response to the reference data read by the color sensor;
   (e) receiving said signal from step (d) in a color correction circuit;
   (f) feeding data to be printed from a host computer; and
   (g) printing the data from the host computer and correcting the color of the data in response to the signal in the color correction circuit.

5. The method of claims 4, further including a step of cutting off the reference data from the substrate.

* * * * *